(12) United States Patent
Dykes et al.

(10) Patent No.: US 11,097,600 B2
(45) Date of Patent: Aug. 24, 2021

(54) METHOD AND SYSTEM FOR ADAPTIVE POWER ENGINE CONTROL

(71) Applicant: THERMO KING CORPORATION, Minneapolis, MN (US)

(72) Inventors: David J. Dykes, Eagan, MN (US); Carl A. Withey, St. Louis Park, MN (US); Mitchell Anthony Tramp, Plymouth, MN (US)

(73) Assignee: Thermo King Corporation, Minneapolis, MN (US)

( * ) Notice: Subject to any disclaimer, the term of this patent is extended or adjusted under 35 U.S.C. 154(b) by 556 days.

(21) Appl. No.: 15/686,982

(22) Filed: Aug. 25, 2017

(65) Prior Publication Data

US 2019/0061473 A1    Feb. 28, 2019

(51) Int. Cl.
*B60H 1/32* (2006.01)
*F02D 41/02* (2006.01)
(Continued)

(52) U.S. Cl.
CPC ......... *B60H 1/3208* (2013.01); *B60H 1/3232* (2013.01); *F02B 63/06* (2013.01); *F02D 29/02* (2013.01); *F02D 41/021* (2013.01); *B60H 2001/325* (2013.01); *B60H 2001/327* (2013.01); *B60H 2001/3238* (2013.01); *B60H 2001/3273* (2013.01); *B60H 2001/3275* (2013.01); *B60H 2001/3285* (2013.01); *F02D 2200/101* (2013.01); *F02D 2250/18* (2013.01)

(58) Field of Classification Search
CPC .......... B60H 1/3205; B60H 2001/3285; B60H 1/3208; B60H 1/3232; B60H 1/3226; B60H 2001/3273; B60H 2001/327; B60H 2001/3275; B60H 2001/3238; B60H 2001/325; F02D 29/02; F02D 41/021; F02D 2200/101; F02D 2250/18; F02B 63/06
USPC ....................................................... 62/228.1
See application file for complete search history.

(56) References Cited

U.S. PATENT DOCUMENTS 3,088,291 A * 5/1963 Long ........................ F25B 41/20
                                                    62/192
3,088,656 A * 5/1963 Hartley .................... F04B 49/00
                                                    417/274
(Continued)

FOREIGN PATENT DOCUMENTS

CN        106286252           1/2017
DE        10202111 A1 *       7/2003   ............. F01N 3/323

*Primary Examiner* — Larry L Furdge
*Assistant Examiner* — Kirstin U Oswald
(74) *Attorney, Agent, or Firm* — Hamre, Schumann, Mueller & Larson, P.C.

(57) ABSTRACT

A method for adaptive power engine control of a transport refrigeration unit (TRU) is provided. The method includes determining a current compressor power of a compressor of the TRU. The method also includes determining an adaptive compressor power error of the compressor. Also, the method includes calculating and setting a target compressor power of the compressor based on the current compressor power and the adaptive compressor power error. Further, the method includes determining a suction pressure control point of the compressor based on the target compressor power and a compressor curve map. Moreover, the method includes operating the compressor with the suction pressure control point of the compressor.

21 Claims, 8 Drawing Sheets

(51) Int. Cl.
  *F02B 63/06* (2006.01)
  *F02D 29/02* (2006.01)

(56) References Cited

U.S. PATENT DOCUMENTS

| | | | | |
|---|---|---|---|---|
| 3,890,063 A * | 6/1975 | Spafford | F04B 49/20 | 417/27 |
| 4,330,237 A * | 5/1982 | Battah | F04B 35/002 | 417/2 |
| 4,486,148 A * | 12/1984 | Battah | F04B 35/002 | 417/2 |
| 4,495,778 A * | 1/1985 | Shaw | G05D 23/1912 | 62/209 |
| 4,496,286 A * | 1/1985 | Gagnon | F02P 5/1516 | 417/22 |
| RE31,835 E * | 2/1985 | Rannenberg | F04D 29/462 | 415/27 |
| 4,505,122 A * | 3/1985 | Inomata | F04B 49/02 | 137/625.31 |
| 4,667,480 A * | 5/1987 | Bessler | B60H 1/3205 | 318/254.1 |
| 4,723,416 A * | 2/1988 | Suzuki | B60H 1/3208 | 62/226 |
| 4,856,291 A * | 8/1989 | Takahashi | B60H 1/3208 | 62/217 |
| 4,899,549 A * | 2/1990 | Berge | F25B 27/00 | 236/75 |
| 5,014,522 A * | 5/1991 | Noji | B60H 1/00785 | 62/161 |
| 5,031,690 A * | 7/1991 | Anderson | B64F 1/364 | 165/43 |
| 5,099,654 A * | 3/1992 | Baruschke | B60H 1/3208 | 62/180 |
| 5,140,826 A * | 8/1992 | Hanson | B60H 1/00014 | 123/142.5 R |
| 5,161,383 A * | 11/1992 | Hanson | B60H 1/3226 | 62/81 |
| 5,168,713 A * | 12/1992 | Howland | B60H 1/00007 | 62/117 |
| 5,172,560 A * | 12/1992 | Jurewicz | F25D 29/003 | 62/89 |
| 5,199,272 A * | 4/1993 | Yamanaka | B60H 1/3208 | 62/133 |
| 5,201,185 A * | 4/1993 | Hanson | B60H 1/3207 | 62/126 |
| 5,228,301 A * | 7/1993 | Sjoholm | F25B 41/20 | 62/84 |
| 5,241,832 A * | 9/1993 | Nekola | F25B 31/006 | 62/117 |
| 5,285,649 A * | 2/1994 | Yamanaka | B60H 1/3208 | 123/339.17 |
| 5,291,745 A * | 3/1994 | Hanson | F24F 1/02 | 62/89 |
| 5,291,941 A * | 3/1994 | Enomoto | B60H 1/00007 | 165/62 |
| 5,454,229 A * | 10/1995 | Hanson | B60H 1/3208 | 62/126 |
| 5,557,938 A * | 9/1996 | Hanson | B60H 1/3208 | 62/126 |
| 5,598,718 A * | 2/1997 | Freund | B60H 1/00914 | 62/238.6 |
| 5,653,119 A * | 8/1997 | Kimura | B60H 1/3222 | 62/228.5 |
| 5,669,225 A * | 9/1997 | Beaverson | F25B 49/025 | 236/78 D |
| 5,703,777 A * | 12/1997 | Buchhop | G01M 15/102 | 123/1 A |
| 5,724,941 A * | 3/1998 | Suzuki | B60H 1/00978 | 123/339.15 |
| 5,884,497 A * | 3/1999 | Kishita | B60H 1/3214 | 62/193 |
| 6,244,060 B1 * | 6/2001 | Takano | B60H 1/3205 | 62/196.4 |
| 6,314,750 B1 * | 11/2001 | Ishikawa | B60H 1/00921 | 62/324.1 |
| 6,357,242 B1 * | 3/2002 | Farley | B60H 1/3208 | 62/133 |
| 6,367,269 B1 * | 4/2002 | Hanson | B60H 1/3225 | 62/126 |
| 6,367,272 B1 * | 4/2002 | Zeng | B60H 1/00907 | 62/133 |
| 6,385,982 B1 * | 5/2002 | Ota | F04B 27/1804 | 62/209 |
| 6,425,254 B1 * | 7/2002 | Ota | B60H 1/3208 | 62/133 |
| 6,466,853 B1 * | 10/2002 | Niimi | B60H 1/3208 | 477/97 |
| 6,481,227 B1 * | 11/2002 | Ota | F04B 27/1804 | 62/209 |
| 6,588,222 B1 * | 7/2003 | Urbank | B60H 1/3205 | 62/127 |
| 6,910,341 B2 * | 6/2005 | Srichai | F25B 49/02 | 62/115 |
| 6,996,997 B2 * | 2/2006 | Wiff | F25D 29/003 | 62/127 |
| 8,544,270 B2 * | 10/2013 | Kasuya | F01K 23/065 | 60/618 |
| 9,463,681 B2 * | 10/2016 | Olaleye | B60H 1/00885 | |
| 9,499,027 B2 * | 11/2016 | Steele | B60H 1/00364 | |
| 2001/0006059 A1 * | 7/2001 | Lee | F02D 29/02 | 123/436 |
| 2001/0017036 A1 * | 8/2001 | Kawaguchi | F25B 49/022 | 62/133 |
| 2002/0011074 A1 * | 1/2002 | Suitou | F25B 49/022 | 62/228.3 |
| 2002/0032514 A1 * | 3/2002 | Kuroda | B60W 30/18145 | 701/96 |
| 2002/0073722 A1 * | 6/2002 | Ota | F04B 27/18 | 62/228.5 |
| 2002/0166330 A1 * | 11/2002 | Matsubara | B60H 1/3216 | 62/133 |
| 2003/0037553 A1 * | 2/2003 | Sulc | B60H 1/00907 | 62/151 |
| 2003/0079484 A1 * | 5/2003 | Matsuoka | B60H 1/3222 | 62/180 |
| 2003/0131612 A1 * | 7/2003 | Wakisaka | B60H 1/3222 | 62/133 |
| 2003/0192326 A1 * | 10/2003 | Masuda | B60H 1/3208 | 62/133 |
| 2003/0216856 A1 * | 11/2003 | Jacobson | F02B 37/00 | 701/114 |
| 2004/0031277 A1 * | 2/2004 | Hirose | B60H 1/3205 | 62/186 |
| 2004/0206102 A1 * | 10/2004 | Homan | B60H 1/322 | 62/228.1 |
| 2005/0086953 A1 * | 4/2005 | Sugesawa | B60H 1/3208 | 62/133 |
| 2006/0243257 A1 * | 11/2006 | Freund | F02N 19/02 | 123/550 |
| 2006/0248904 A1 * | 11/2006 | Ludwig | B60H 1/3232 | 62/151 |
| 2007/0101736 A1 * | 5/2007 | Sawada | B60H 1/3208 | 62/230 |
| 2007/0144193 A1 * | 6/2007 | Crane | F25B 49/022 | 62/228.4 |
| 2009/0000322 A1 * | 1/2009 | Hatakeyama | B60H 1/3208 | 62/228.3 |
| 2009/0260375 A1 * | 10/2009 | Miyazaki | B60H 1/3208 | 62/133 |
| 2009/0293521 A1 * | 12/2009 | Major | B60H 1/005 | 62/228.1 |
| 2009/0314018 A1 * | 12/2009 | Burchill | F25B 31/006 | 62/228.4 |
| 2010/0326127 A1 * | 12/2010 | Oomura | F25B 41/20 | 62/498 |
| 2011/0219797 A1 * | 9/2011 | Taguchi | F25B 49/022 | 62/129 |
| 2012/0227427 A1 * | 9/2012 | Liu | F25B 1/10 | 62/115 |

(56) References Cited

U.S. PATENT DOCUMENTS

| | | | |
|---|---|---|---|
| 2012/0247138 A1* | 10/2012 | Senf, Jr. | F25B 49/02 62/191 |
| 2013/0118195 A1* | 5/2013 | Ikemiya | F25B 49/00 62/126 |
| 2013/0283826 A1* | 10/2013 | Burnham | F25B 49/025 62/56 |
| 2014/0223933 A1* | 8/2014 | Steele | F25B 27/02 62/98 |
| 2014/0250941 A1* | 9/2014 | Steele | F25D 11/003 62/323.1 |
| 2014/0260387 A1 | 9/2014 | Takenaka et al. | |
| 2015/0007552 A1* | 1/2015 | Steele | B60P 3/20 60/274 |
| 2015/0013357 A1* | 1/2015 | Stockbridge | B60P 3/20 62/115 |
| 2015/0168032 A1* | 6/2015 | Steele | F01N 5/025 62/61 |
| 2016/0361975 A1* | 12/2016 | Blatchley | B60H 1/3216 |
| 2017/0057323 A1* | 3/2017 | Neu | F25B 49/02 |
| 2017/0349031 A1* | 12/2017 | Rollinson | B60H 1/3208 |
| 2019/0041111 A1* | 2/2019 | Sun | F25B 49/027 |

\* cited by examiner

METHOD AND SYSTEM FOR ADAPTIVE POWER ENGINE CONTROL

FIELD

This disclosure relates generally to adaptive load control for a transport refrigeration system (TRS). More specifically, the disclosure relates to a method and system of adjusting a load of an engine powering the TRS based on operation of the engine.

BACKGROUND

A TRS can be used to control an environmental condition within a transport unit. An environmental condition can be temperature, humidity, air quality, and the like. A transport unit can be, for example, a container (such as a container on a flat car, an intermodal container, etc.), a truck, a box car, or other similar transport unit. A refrigerated transport unit is a transport unit with a TRS. Refrigerated transport units are can be used to transport perishable items such as produce, frozen foods, pharmaceuticals, and meat products.

Typically the TRS includes a transport refrigeration unit (TRU) that is attached to the transport unit to control one or more environmental conditions of an internal space within the transport unit. The TRU can include a compressor, a condenser, an expansion valve, an evaporator, and fans or blowers to control the heat exchange between the air inside the cargo space and the ambient air outside of the refrigerated transport unit. Power generated by an engine can be distributed to the compressor of the TRU and non-compressor components of the TRU. The non-compressor components can include, for example, fans, blowers, sensors, alternators, etc.

SUMMARY

This disclosure relates generally to adaptive load control for a transport refrigeration system (TRS). More specifically, the disclosure relates to a method and system of adjusting a load of an engine powering the TRS based on operation of the engine.

Emission standards for engines such as European Non-Road Mobile Machinery (NRMM) Stage V regulation, or North American Tier 4 Standards, may put limitations on the output of engine power. North American not to exceed (NTE) standard may further limit the amount of power a system such as a TRS can use from the engine.

In some embodiments, to meet the emission standards, a 25 horsepower (or less than 25 horsepower) engine or a 19 kilowatts (or less than 19 kilowatts) engine can be used in a TRS. The 25 horsepower (or less) engine allows the TRS to use all the power available in the engine and still comply with the emission standards. In other embodiments, an engine that is larger than 25 horsepower or larger than 19 kilowatts can be used in the TRS.

When the engine reaches its limit, mechanically there may not be enough fuel to supply to the engine, and the engine can droop—that is, the speed of the engine can fall rapidly and can be noticeable (e.g. audible engine drooping). When the engine droops, the engine needs to be recovered quickly because the drooping can result in potential stalling of the engine if corrective action is not performed quickly. The embodiments disclosed herein can maximize the use of available power from the engine. Other advantages of the embodiments disclosed herein can include reacting quickly to changing system loads, avoiding engine drooping, preventing engine from stalling, minimizing audible engine drooping sound to a user, ensuring engine operation that meets governmental regulations/standards, etc.

In some embodiments, the engine can be a mechanically driven engine and the engine does not have an engine control unit (ECU). In other embodiments, the engine can have an ECU and the embodiments disclosed herein can provide backup engine and load control when the ECU fails.

The embodiments described herein provide embodiments for effectively allocating and controlling a load of an engine powering a TRU by adjusting an amount of power required by a compressor of the TRU from the engine. In some embodiments, a real time engine speed such as revolutions per minute (RPM) of the engine can be determined. An engine speed error can be calculated based on the real time engine speed and a predetermined nominal engine speed. An adaptive compressor power error can be determined based on the engine speed error and a current position of an electronic throttling valve (ETV). The current power the compressor takes from the engine can be determined via a correlation between suction and discharge pressure of the compressor and the compressor speed (revolutions per minute). In some embodiments, the engine speed and the compressor speed correlate to about a 1:1 ratio. When the ratio is at or about 1:1, the engine speed can be used in determining the current power the compressor takes from the engine. In some embodiments, a ratio between the engine speed and the compressor speed is not at or about 1:1. When the ratio is not at or about 1:1, the compressor speed can be determined without using the engine speed, and the compressor speed can be used in determining the current power the compressor takes from the engine. A target compressor power can be calculated based on the current power the compressor takes from the engine and the adaptive compressor power error. A target suction pressure (suction pressure control point) of the compressor can be determined via the correlation between the suction and discharge pressure of the compressor and the target compressor power. The load of the engine can be adjusted based on the suction pressure control point by controlling, via the ETV, an amount of refrigerant flowing into a suction port of a compressor of the TRS. This can allow the TRU to use a maximum power available from the engine under a given environment or situation while still ensuring that the engine will not be overloaded and/or stalled.

In one embodiment, a method for adaptive power engine control of a transport refrigeration unit (TRU) is provided. The method includes determining a current compressor power of a compressor of the TRU. The method also includes determining an adaptive compressor power error of the compressor. Also, the method includes calculating and setting a target compressor power of the compressor based on the current compressor power and the adaptive compressor power error. Further, the method includes determining a suction pressure control point of the compressor based on the target compressor power and a compressor curve map. Moreover, the method includes operating the compressor with the suction pressure control point of the compressor.

In another embodiment, a TRU with adaptive power engine control is provided. The TRU includes a refrigeration circuit and a controller. The refrigeration circuit includes a compressor, a condenser, an expansion device, an evaporator, and an electronic throttling valve (ETV). The controller is configured to control operation of the refrigeration circuit. The ETV is configured to control a volume of refrigerant flowing into a suction port of the compressor of the TRU. The controller is configured to: determine a suction pressure of the compressor and a discharge pressure of the compressor, an engine speed of an engine powering the TRU, and an ETV position of the ETV; determine a current compressor power of the compressor based on the suction pressure and the discharge pressure, the engine speed, and a compressor curve map; determine an adaptive compressor power error of the compressor based on the engine speed and the ETV position; calculate a target compressor power of the compressor based on the current compressor power and the adaptive compressor power error: control a suction pressure of the compressor based on the target compressor power; and operate the compressor with the controlled suction pressure.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTIONS

This disclosure relates generally to adaptive load control for a transport refrigeration system (TRS). More specifically, the disclosure relates to a method and system of adjusting a load of an engine of a TRU based on operation of the engine.

Embodiments for adaptive power engine control of a TRU are disclosed. The embodiments disclosed herein can maximize the engine power available to the TRS while maintaining a target engine speed (e.g. RPM). The embodiments disclosed herein can simplify the power control system, provide improved performance and effective control by controlling the ETV based on increments of power (e.g. compressor power levels) compared with a control of a refrigerant flow by counting the steps of the ETV.

Figure 1:
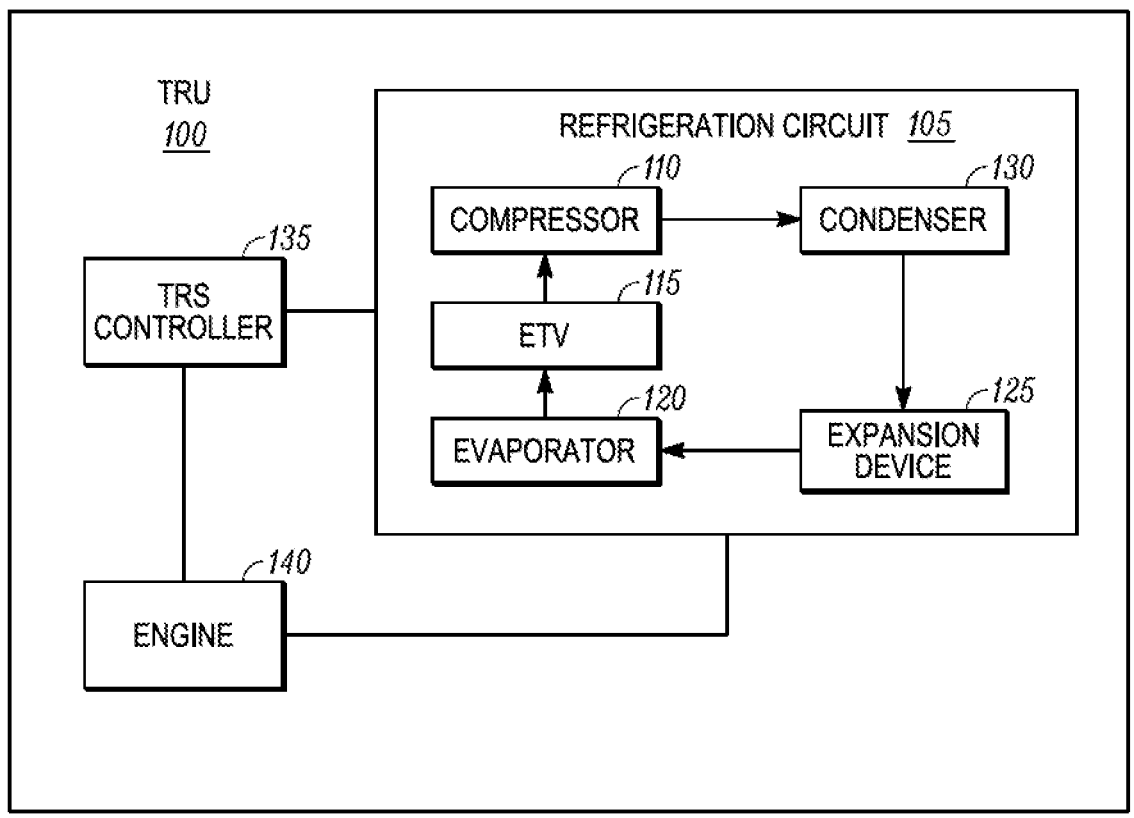
FIG. 1 illustrates a block diagram of a TRU, according to one embodiment.

FIG. 1 illustrates a block diagram of components within a TRU 100, according to one embodiment. The TRU 100 includes a refrigeration circuit 105, a TRS controller 135, and a prime mover or engine 140. The engine 140 is configured to provide power for the TRU 100 and other components of a TRS (not shown). For example, the engine 140 can be configured to provide power to drive a compressor 110. It will be appreciated that in some embodiments, the engine 140 is external to and not part of the TRU 100 (e.g., the engine 140 is part of a generator set that is separate from the TRU 100). Also, in some embodiments, the TRU 100 can be powered, for example, by one or more external power sources such as a generator set, a vehicle prime mover (e.g., engine), shore power, etc.

The TRS controller 135 is connected to and configured to control the refrigerant circuit 105, and the engine 140. The TRS controller 135 controls the refrigeration circuit 105 to determine various operating conditions (e.g., temperature, humidity, etc.) of an internal space of a transport unit and can be powered by the engine 140 and/or another power source (not shown) (e.g., a battery).

In some embodiments, the engine 140 can be a diesel combustion engine. In some embodiments, the engine 140 can have multiple speed modes including, for example, a high-speed mode and a low-speed mode. In some embodiments, the engine 140 can run in variable speeds. The engine 140 can output a power supply up to a maximum allowable power, i.e., the maximum amount of power that can be supplied by the engine under a certain condition or under a certain mode, e.g., the high-speed mode. The maximum allowable power can be determined by, for example, the maximum amount of fuel available to the engine.

In some embodiments, the engine 140 can include a sensor (not shown) configured to monitor the speed (e.g. RPM) of the engine 140. The monitored speed of the engine 140 can be sent to the TRS controller 135. It is to be understood that the RPM of the engine 140 can be determined by measuring other parameter(s) of the engine 140 including, for example, a torque parameter.

The refrigeration circuit 105 regulates various operating conditions (e.g., temperature, humidity, etc.) of an internal space of a transport unit based on instructions received from the TRS controller 135. The refrigeration circuit 105 includes a compressor 110, an evaporator 120, an expansion device 125, and a condenser 130 that together cool the internal space and any perishable cargo contained therein.

The refrigeration circuit 105 further includes an ETV 115. The ETV 115 is positioned upstream of an inlet of the compressor 110 and configured to control a volume of refrigerant flowing into a suction port of the compressor 110. The ETV 115 can be controlled, for example, by the TRS controller 135.

In some embodiments, the ETV 115 can have a variable opening (not shown) that is configured to allow a fluid to flow therethrough. A size of the variable opening (also referred to herein an opening level) of the ETV 115 can be controlled, for example, electronically. Controlling the opening level of the ETV 115 can regulate the volume of the refrigerant flowing into the inlet of the compressor 110. In some embodiments, an opening level of the ETV 115 can be controlled in a step-wise matter from a frilly open state (100%) to a fully closed state (0%). For example, in one particular example of the ETV 115, there can be 800 steps between the fully open state and the fully closed state, with 0 being the fully closed state and 800 being the fully open state. A value between 0 and 800 corresponds to a particular size of the variable opening between the fully open state and the fully closed state, with a larger value corresponding to a larger opening size.

Figure 2:
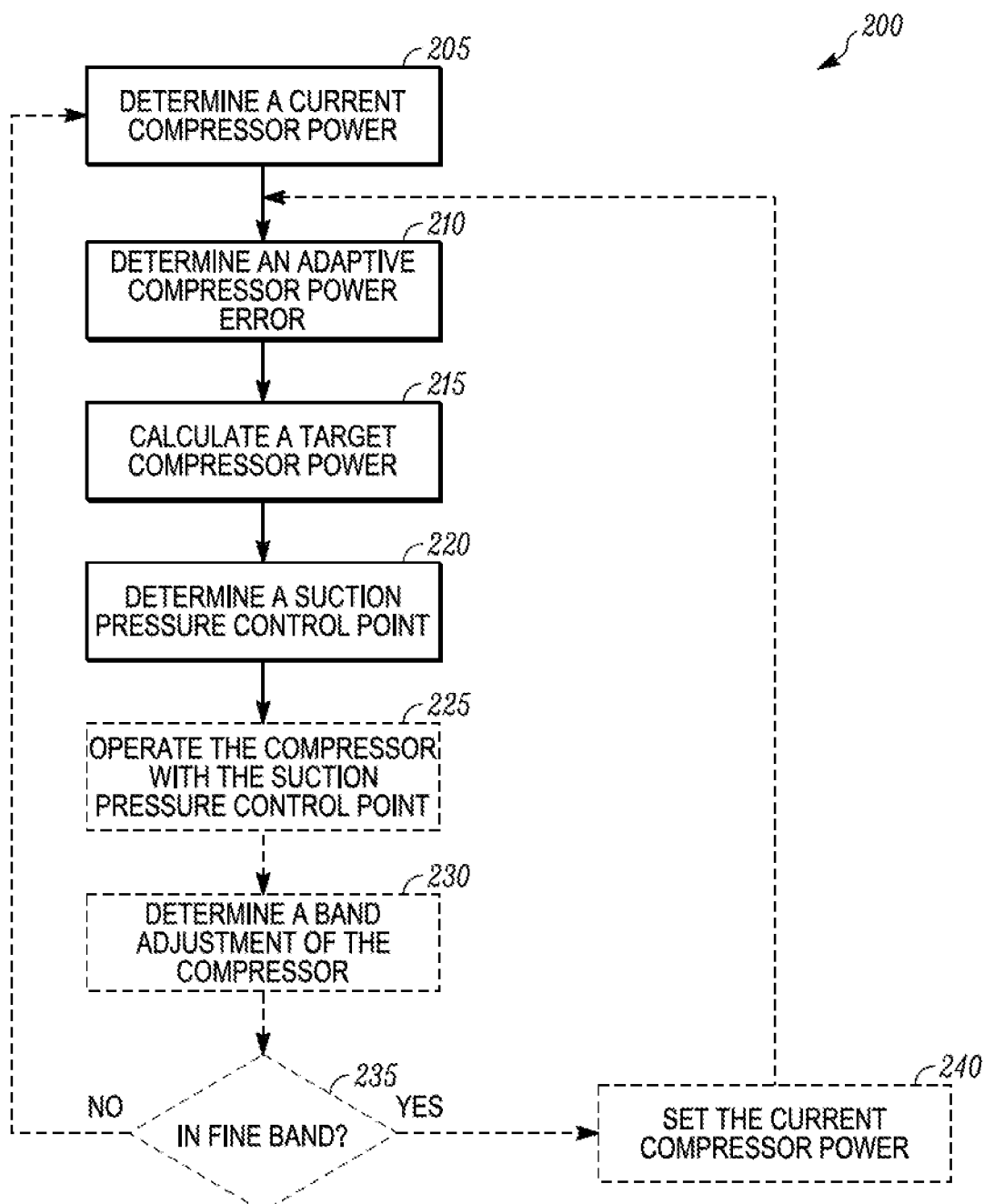
FIG. 2 illustrates a flow diagram of a method for adaptive power engine control of a TRU, according to one embodiment.
Figure 4:
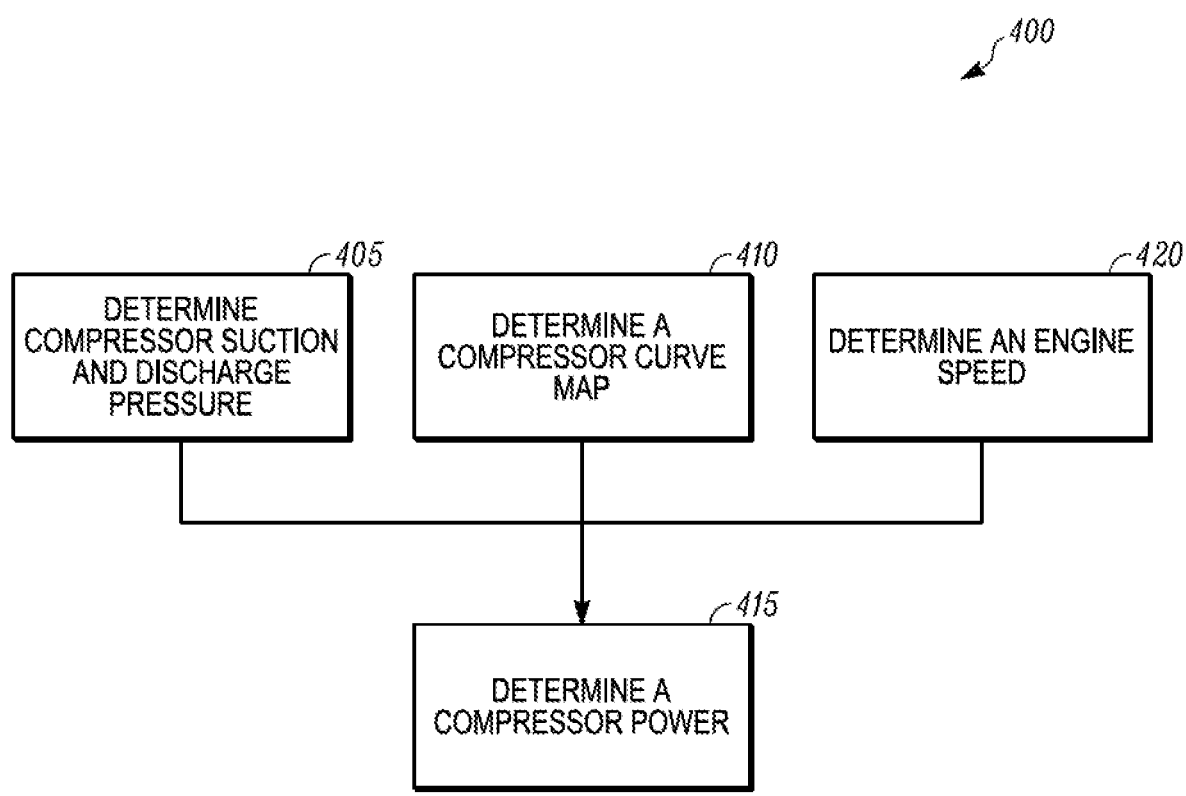
FIG. 4 illustrates a flow diagram of a method for determining a compressor power, according to some embodiments.

FIG. 2 illustrates a flow diagram of a method 200 for adaptive power engine control of a TRU (such as the TRU 100 shown in FIG. 1), according to one embodiment. At. 205, a current compressor power (e.g. the power a compressor currently takes from an engine (e.g., the engine 140 shown in FIG. 1), the power from the engine that is available for the compressor, etc.) is determined, for example, by a controller (e.g., the TRS controller 135 shown in FIG. 1). FIG. 4, described below, illustrates a method 400 for determining a compressor power, according to one embodiment.

In some embodiments, the engine speed and the compressor speed correlate to about a 1:1 ratio. When the ratio is at or about 1:1, the engine speed can be used in determining the compressor power. In some embodiments, the engine speed and the compressor speed do not correlate or are not at or about a 1:1 ratio. In these embodiments, the compressor speed can be determined without using the engine speed, and the compressor speed can be used in determining the compressor power. In the embodiments described below, the engine speed is used in determining the compressor power as these embodiments are directed to when the compressor speed and the engine speed correlate to at or about a 1:1 ratio. It will be appreciated that when the compressor speed and the engine speed are not correlated, the compressor speed can be determined and used in determining the compressor power.

Figure 5:
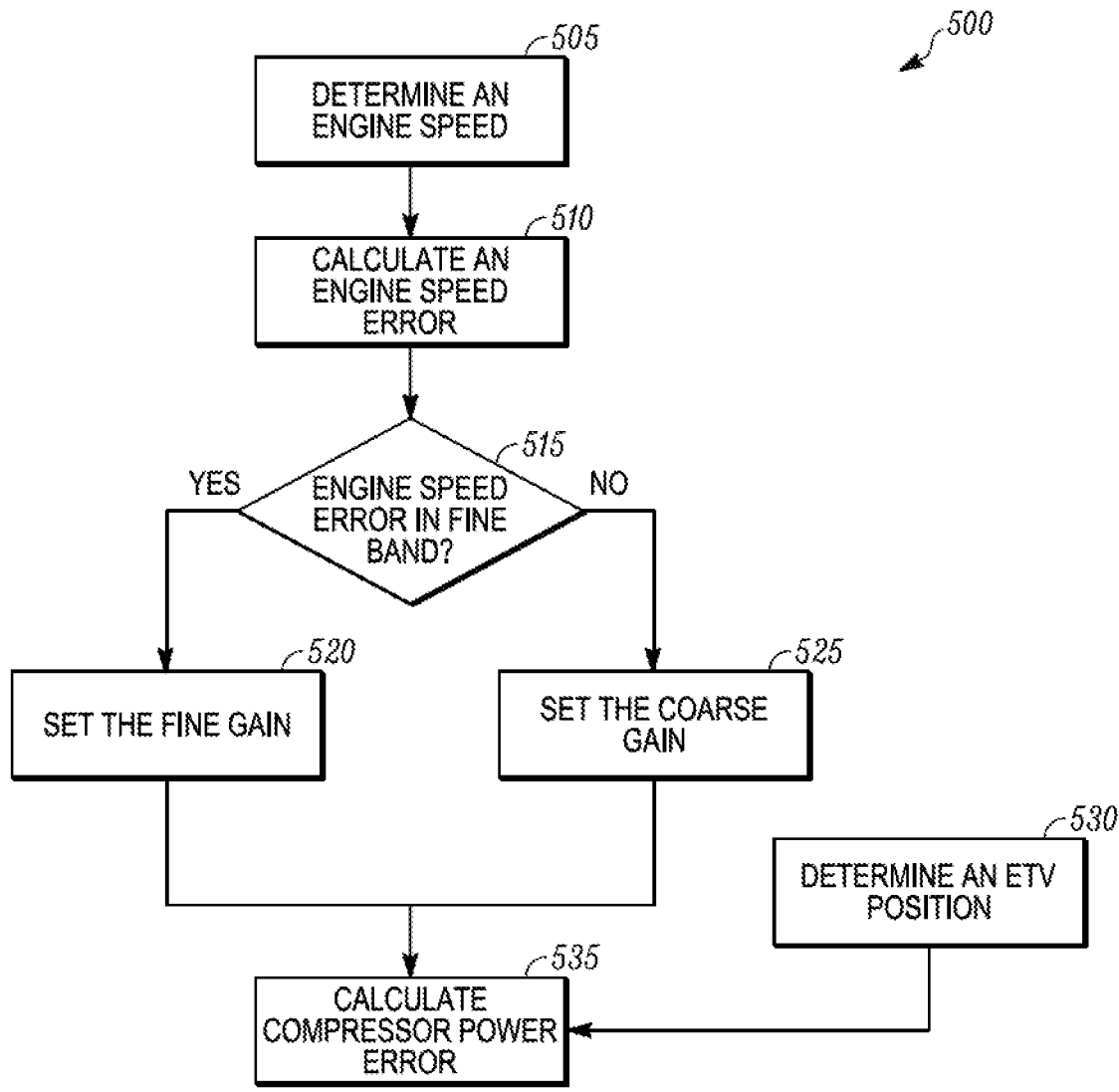
FIG. 5 illustrates a flow diagram of a method for calculating a compressor power error, according to some embodiments.

The method 200 then proceeds to 210. At 210, an adaptive compressor power error of the compressor is determined, for example, by the controller. The adaptive compressor power error is an amount of engine power that should be further allocated to the compressor when the engine speed is elevated, or the amount of power that should be taken away from the compressor when the engine is drooping. An elevated engine speed typically indicates that the system is not using all available power from the engine, and that the measured engine speed is greater than a predetermined or target nominal speed. Engine drooping typically indicates that the system is overloading the engine, that the measured engine speed is less than the predetermined nominal speed, and that there is not enough fuel to supply power at the predetermined nominal speed. FIG. 5, described below, illustrates a method 500 for determining an adaptive compressor power error, according to one embodiment.

Engine droop can signify that the engine is overloading. Engine droop can result in a rapid decay in the engine power output. The rapid decay of the engine power output can result in potential stalling of the engine if corrective action is not performed quickly. In addition, severe and/or prolonged engine drooping may be audible to a user. The embodiments disclosed herein can provide a fast control system response to a drooping engine.

On the other hand, when available engine power is not fully used, the engine speed can begin to elevate. An elevated engine can result in reduced integral unit capacity. If an elevated engine speed is not addressed quickly, slower than necessary temperature pull ups or pull downs (e.g. initial heating or cooling of an internal space of a transport unit to get to a desired temperature before loading cargo into the internal space) may occur. The embodiments disclosed herein can provide a fast control system response to an elevated engine speed.

Figure 6:
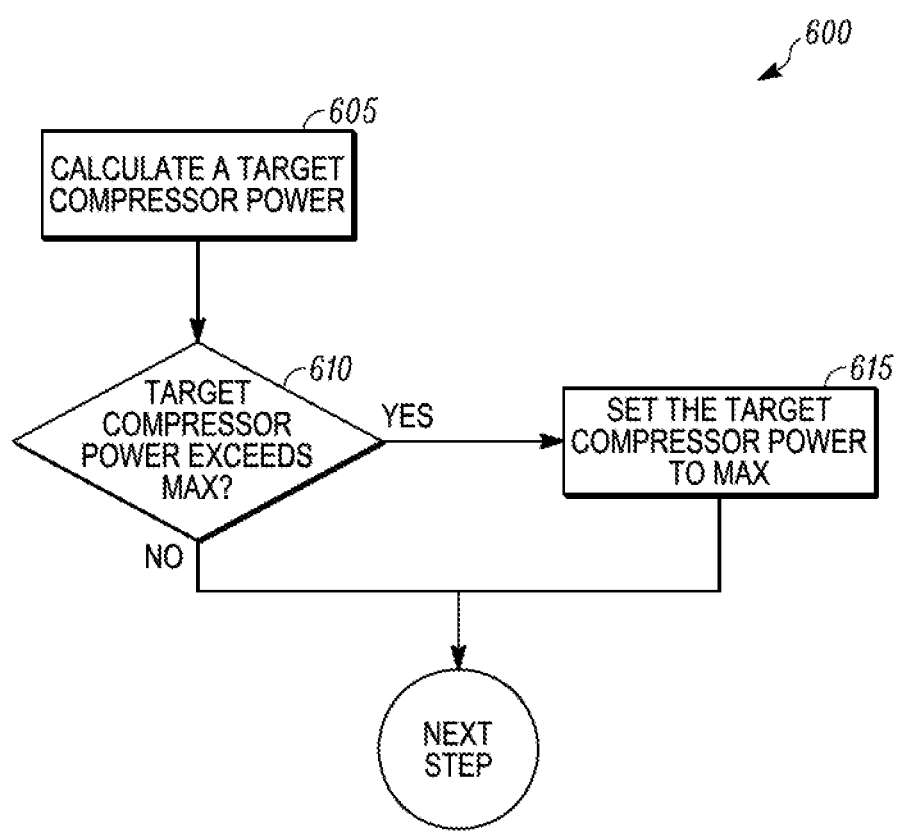
FIG. 6 illustrates a flow diagram of a method for setting a target compressor power, according to some embodiments.

The method 200 then proceeds to 215. At 215, a target or desired compressor power of the compressor is determined, for example, by the controller. The target compressor power can be determined, for example, based on the current compressor power and the adaptive compressor power error. FIG. 6, described below, illustrates a method 600 for calculating a target compressor power, according to one embodiment.

When the adaptive compressor power error indicates an elevated engine speed, an amount of power (e.g. the adaptive compressor power error determined at 210) can be added to the current compressor power (e.g. current power the compressor takes from the engine determined at 205). That is, the target compressor power can be the sum of the adaptive compressor power error and the current compressor power. To achieve the target compressor power, an amount of refrigerant flowing into the compressor can be increased and the engine load can be added. Increasing the refrigerant flow can raise the capacity of the compressor and raise the power required to run the compressor.

On the other hand, when the adaptive compressor power error indicates that the engine is drooping, an amount of power (e.g. the adaptive compressor power error determined at 210) can be taken away from the current compressor power current power the compressor takes from the engine determined at 205). That is, the target compressor power can be the adaptive compressor power error subtracted from the current compressor power. To achieve the target compressor power, an amount of refrigerant flowing into the compressor can be decreased and the engine load can be reduced. Decreasing the refrigerant flow can lower the capacity of the compressor and lower the power required to run the compressor.

The method 200 then proceeds to 220. At 220, a suction pressure control point of the compressor is determined, for example, by the controller. The suction pressure control point can be based on the target compressor power, a determined engine speed, and a compressor curve map. The controller can be configured to store the compressor curve map. A compressor curve map is a set of correlations between a compressor power, a suction pressure of the compressor, a discharge pressure of the compressor, and a determined engine speed. The compressor curve map can be determined based on testing or simulation data of a similar TRU. When, for example, a compressor power and an engine speed are shown, the suction pressure of the compressor can be determined or estimated via the compressor curve map. When suction pressure of the compressor, a discharge pressure of the compressor, and an engine speed are known, the compressor power can be determined or estimated. The suction pressure of the compressor can be monitored, for example, by one or more pressure sensors along a suction line of the refrigeration circuit. The discharge pressure of the compressor can be monitored, for example, by one or more pressure sensors along a discharge line of the refrigeration circuit. Examples for determining an engine speed are discussed below at 420 of FIG. 4 or 505 of FIG. 5. At 220, the target or desired suction pressure (suction pressure control point) of the compressor can be determined or estimated via the compressor curve map using the target compressor power and the engine speed.

Figure 7:
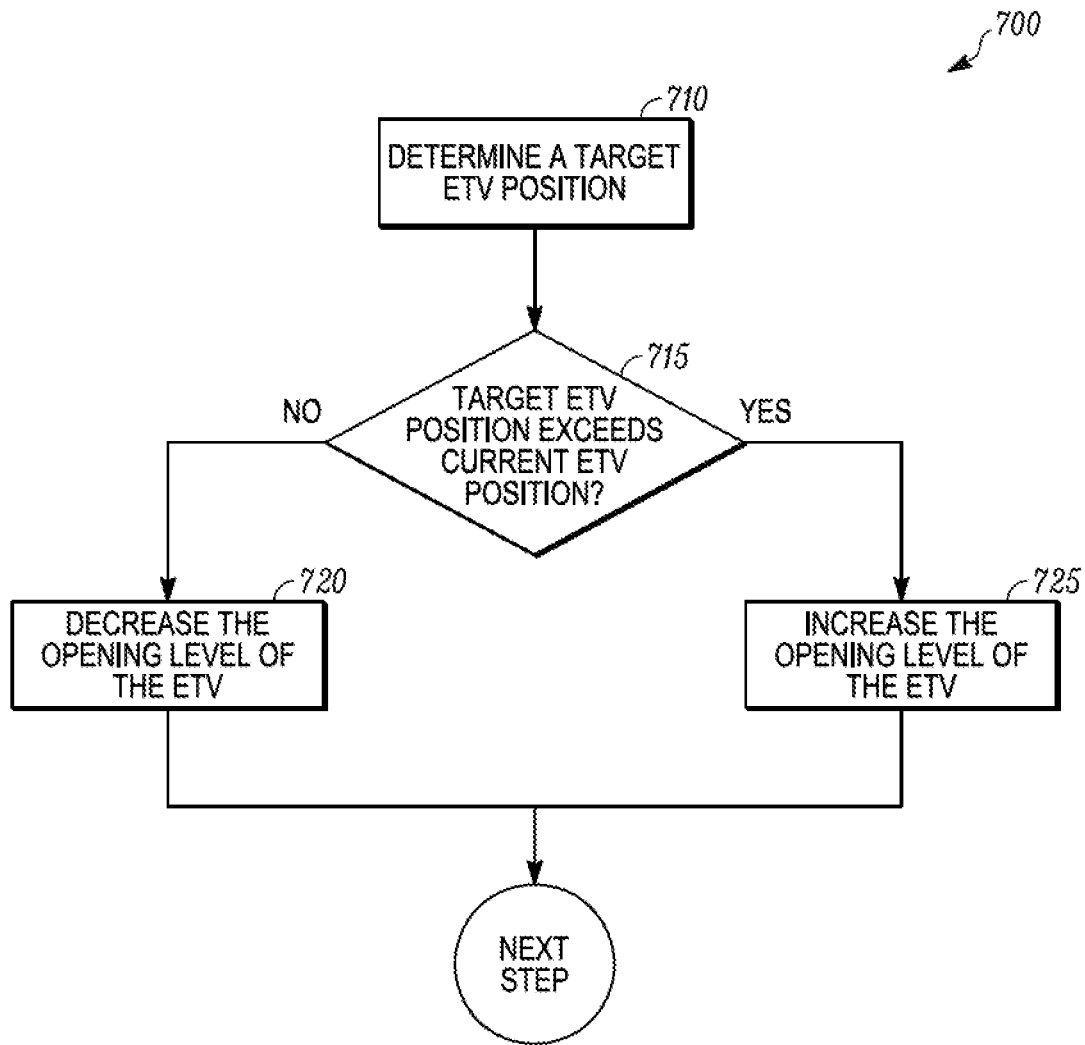
FIG. 7 illustrates a flow diagram of a method for controlling an ETV based on a compressor suction pressure control point, according to some embodiments.

The method 200 then proceeds to 225. At 225, the controller operates the compressor to achieve the suction pressure control point determined at 220. In some embodiments, the controller can operate the compressor to achieve the suction pressure control point by adjusting an opening level of an ETV (e.g., the ETV 115 shown in. FIG. 1). That is, the controller can control a suction pressure of the compressor by controlling an amount of refrigerant flowing into the compressor. The controller can adjust the ETV by decreasing or increasing an opening level of the ETV to control the amount of refrigerant flowing into the compressor, and thus determine the target or desired suction pressure (also referred to herein as a suction pressure control point). The difference between a monitored suction pressure and the suction pressure control point can be used by the controller to adjust the ETV. FIG. 7, described below, illustrates a method 700 for operating a compressor to achieve a suction pressure control point, according to one embodiment.

When the suction pressure control point is greater than the monitored suction pressure, the opening level of the ETV can be increased to add an amount of refrigerant flowing into the compressor. When the suction pressure control point is less than the monitored suction pressure, the opening level of the ETV can be decreased to reduce the amount of refrigerant flowing into the compressor. The adjustment of the ETV can result in an engine load change. A load can be added to the engine (e.g. the compressor is operated to require more power from the engine) when the opening level of the ETV is increased, and the engine speed is reduced as a result. A load is reduced from the engine (e.g. the compressor is operated to require less power from the engine) when the opening level of the ETV is decreased, and the engine speed is increased as a result.

When the suction pressure control point is achieved, the adaptive power engine control of a TRU is complete and the method 200 returns to 205 or optionally proceeds to optional 230.

At optional 230, the engine speed is determined. In some embodiments, the engine speed can be determined by an engine speed sensor. The engine speed can also be determined by monitoring other parameter(s) of the engine including, for example, a torque parameter. At optional 230, the determined engine speed is then compared with a target engine speed (nominal engine speed) by the controller, and the method 200 proceeds to optional 235.

At optional 235, when the difference between the determined engine speed and the nominal engine speed is within a predetermined range (for example, at or about 0 RPM to at or about 40 RPM), the controller controls the TRU in a fine adjustment band. In the fine adjustment band, the determined engine speed is typically greater than the nominal engine speed. Accordingly, by increasing a load on the engine, the engine speed back can be brought back to the nominal engine speed. When the difference between the determined engine speed and the nominal engine speed exceeds the predetermined range (for example, greater than about 40 RPM or less than about 0 RPM), the controller controls TRU in a coarse adjustment band. In the coarse adjustment band, the determined engine speed is typically less than the nominal engine speed (e.g. less than about 0 RPM speed error). Accordingly, by reducing a load on the engine, the engine speed can be brought back to the nominal engine speed.

When the controller controls the TRU in the fine adjustment band, the method 200 proceeds to optional 240. At optional 240, the controller sets the current compressor power to the target compressor power determined at 215, and the method 200 proceeds back to 210. Setting the current compressor power to the previous target compressor power can help to reduce the time for recalculating the current compressor power, tune out noise in the calculation, and keep the controller operating the TRU in the fine adjustment band. When the controller controls the TRU in the coarse adjustment hand, the method 200 proceeds back to 205.

Figure 3:
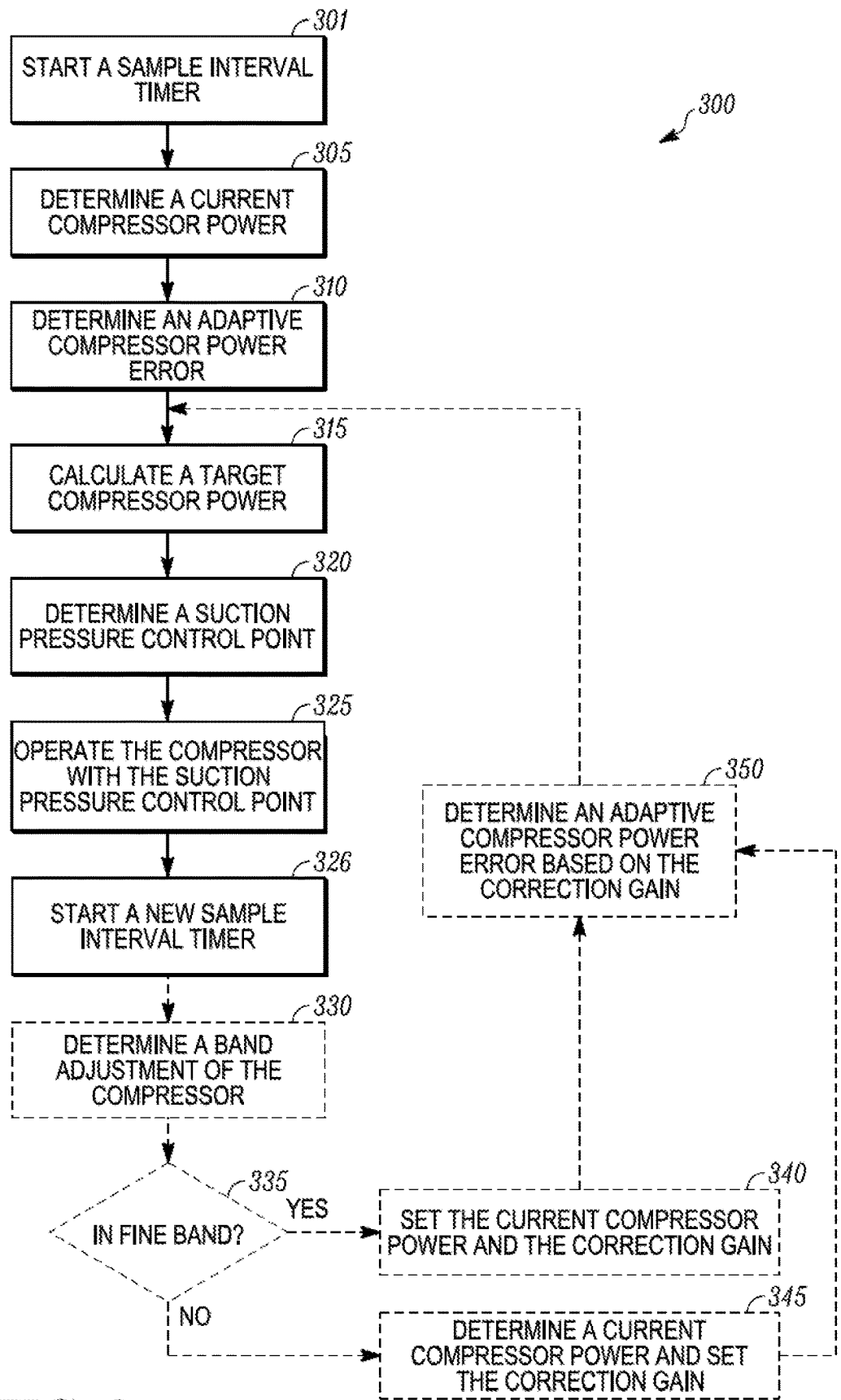
FIG. 3 illustrates a flow diagram of a method for adaptive power engine control of a TRU, according to another embodiment.

FIG. 3 illustrates a flow diagram of a method 300 for adaptive power engine control of a TRU (e.g., the TRU 100 shown in FIG. 1), according to another embodiment. In some embodiments, the method 300 can be used in conjunction with the method 200 described above and shown in FIG. 2. At 301, a suction pressure control point (for adaptive power engine control) sample interval timer is started, by a controller (e.g., the TRS controller 135 shown in FIG. 1). The sample interval timer can have a predetermined timer interval (e.g., one second, 2 seconds, 5 seconds, or any suitable time interval). The sample interval timer (e.g. 1 second) can provide frequent monitoring of an engine speed of an engine (e.g., the engine 140 shown in FIG. 1) powering the TRU, help to decrease refrigeration load when an engine speed is less than a targeted nominal engine speed (as described in further detail below with respect to FIG. 8), and help to prevent the engine from drooping or from an elevated engine speed. The sample interval timer can also help to increase refrigeration load, when the engine speed is greater than the targeted nominal engine speed, and help to load up or pull down the compressor quickly. For example, during pull downs or pull ups (e.g., when attempting to cool or heat the temperature of the internal space as quickly as possible), the shorter the predetermined timer interval, the quicker the controller can determine that the desired temperature setpoint in the internal space has been reached. In another example, in a multi-zone transport refrigeration system, when door(s) in a particular zone are opened/closed, the temperature in the particular zone can return back to the desired setpoint temperature for the particular zone quickly to ensure accurate temperature control over the different temperature zones. The short sample interval timer and the embodiments disclosed herein can help to catch and recover from engine drooping or from an elevated engine speed quickly (e.g., within a minute).

The method 300 then proceeds to 305. At 305 (similar to 205 of FIG. 2), which is further illustrated in detail below with respect to FIG. 4, a current compressor power can he determined, for example, by the controller. The method 300 then proceeds to 310. At 310 (similar to 210 of FIG. 2), which is further illustrated in detail below with respect to FIG. 5, an adaptive compressor power error of the compressor can be determined, for example, by the controller. The method 300 then proceeds to 315. At 315 (similar to 215 of FIG. 2), which is further illustrated in detail below with respect to FIG. 6, a target or desired compressor power of the compressor can be determined, for example, by the controller, based on the current compressor power and the adaptive compressor power error. The method 300 then proceeds to 320. At 320 (similar to 220 of FIG. 2), a suction pressure control point of the compressor can be determined, for example, by the controller, based on the target compressor power, a determined engine speed, and a compressor curve map. The method 300 then proceeds to 325. At 325 (similar to 225 of FIG. 2), which is further illustrated in detail below with respect to FIG. 7, the controller operates the compressor, via adjusting the opening level of the ETV, to achieve the suction pressure control point. The method 300 then proceeds to 326.

At 326, the controller checks if the sample interval timer at 301 is expired. If the sample interval timer at 301 has not yet expired, the controller waits until the timer at 301 is expired, and starts a new suction pressure control point (for adaptive power engine control) sample interval timer. The new suction pressure control point sample interval tinier can have a predetermined timer interval (e.g., one second, 2 seconds, 5 seconds, or any suitable timer interval). Once the new sample time interval is started, the method 300 then proceeds back to 306 or optionally proceeds to optional 330.

At optional 330 (similar to 230 of FIG. 2), a determined engine speed is compared with a target engine speed (nominal engine speed) by the controller, and the method 300 then proceeds to optional 335. At optional 335 (similar to 235 of FIG. 2), the determined engine speed is compared with the nominal engine speed, by the controller, to determine whether the controller is to control the TRU in a fine adjustment band or in a coarse adjustment band.

When the controller determines that the TRU is to be controlled in the fine adjustment band, the method 300 proceeds to optional 340. At optional 340, the controller sets the current compressor power to the target compressor power determined at 315, and sets a correction gain to a fine gain (see detailed description of FIG. 5). The method 300 then proceeds to optional 350.

When the controller determines that the TRU is to be controlled in the coarse adjustment band, the method 300 then proceeds to optional 345. At optional 345, similar to 305, a current compressor power can be determined, for example, by the controller. In addition, at optional 345, the controller sets the correction gain to a coarse gain (see detailed description of FIG. 5), and the method 300 then proceeds to optional 350.

At optional 350, which is similar to 310 (except that the correction gain from optional 340 or optional 345 is used in calculating the adaptive compressor power error, instead of calculating the correction gain as described below with respect to FIG. 5), an adaptive compressor power error of the compressor is determined, for example, by the controller. The method 300 then proceeds back to 315.

FIG. 4 illustrates a flow diagram of a method 400 for determining a current compressor power, according to some embodiments. In these embodiments, the current compressor power is determined using an engine speed of the engine (e.g., the engine 140). That is, in these embodiments, the engine speed and the compressor speed are correlated to at or about a 1:1 ratio. It will be appreciated that in other embodiments where the engine speed and the compressor speed are not correlated, the current compressor power can be determined using, for example, compressor speed. The method 400 can be used, for example, in conjunction with the methods 200 and 300 discussed above and shown in FIGS. 2 and 3.

At 405, suction pressure and discharge pressure of the compressor is determined. The suction pressure of the compressor can be determined, for example, by a controller (e.g., the TRS controller 135 shown in FIG. 1) based on a signal received from a pressure sensor at or near a suction port of the compressor. The discharge pressure of the compressor can be determined, for example, by the controller based on a signal received from a pressure sensor at or near a discharge port of the compressor. At 420 (similar to 505 of FIG. 5), an engine speed (e.g., real time engine speed) of an engine (e.g., the engine 140 shown in FIG. 1) powering a TRU (e.g., the TRU 100 shown in FIG. 1) is determined. The engine speed can be determined by, for example, a signal received by a magnetic pickup sensor near flywheel. At 410, a compressor curve map for the compressor is obtained. A compressor curve map is a set of correlations between a compressor power, suction pressure and discharge pressure of the compressor, and an engine speed of an engine powering the TRU. The compressor curve map can be based on testing and/or simulation data. In some embodiments, the compressor curve map can be stored in a memory portion of the controller. The method 400 then proceeds to 415.

At 415, a current compressor power is determined or estimated, by the controller, based on the suction and discharge pressure, the engine speed, and the compressor curve map. In some embodiments, the current compressor power is determined or estimated by analyzing the compressor curve map at the determined suction and discharge pressure and engine speed.

FIG. 5 illustrates a flow diagram of a method 500 for calculating an adaptive compressor power error, according to some embodiments. The method 500 can be used, for example, in conjunction with the methods 200 and 300 discussed above and shown in FIGS. 2 and 3. At 505, an engine speed (e.g., real time engine speed) of an engine powering the TRU (e.g., the TRU 100 shown in FIG. 1) is determined. For example, in some embodiments, the engine speed can be determined, for example, by a controller or by a speed sensor of the TRU. In some embodiments, the speed sensor can be a magnetic pick-up sensor near a flywheel of the engine. The engine speed can also be determined by measuring other parameter(s) of the engine such as a torque parameter. The method 500 then proceeds to 510.

At 510, an engine speed error (sometimes called "engine speed control error") is calculated based on the determined engine speed and a predetermined target (or nominal) engine speed, by the controller. The method 500 then proceeds to 515.

At 515, if the difference between the determined engine speed and the nominal engine speed is within a predetermined range (e.g., at or about 0 RPM to at or about 40 RPM), then the controller controls the compressor in a fine adjustment band. The method 500 then proceeds to 520. If the difference between the determined engine speed and the nominal engine speed exceeds the predetermined range (e.g., greater than 40 RPM or less than 0 RPM), the controller controls the compressor is in a coarse adjustment band. The method 500 then proceeds to 525.

At 520, a correction gain is set, by the controller, to a fine gain divisor. The fine gain devisor can be a constant (e.g., 15, or any suitable value). The fine gain divisor can be determined based on testing or simulation data of a similar TRU. At 525, a correction gain is set, by the controller, to a coarse gain divisor. The coarse gain devisor can be a constant (e.g., 2, or any suitable value). The coarse gain divisor can be determined based on testing or simulation data of a similar TRU.

At 530, a current ETV position (e.g. an opening level position of ETV) is determined by the controller. The ETV position can be determined by, for example, counting from an ETV index range established at startup by exercising and overdriving a full voltage/drive range of the ETV. The method 500 then proceeds to 535.

At 535, an adaptive compressor power error of the compressor (also referred to as a "suction pressure setpoint engine speed error") is determined by the controller. To determine the adaptive compressor power error, the engine speed error can be converted to a power level by multiplying the engine speed error with a constant derived from an engine power curve (see detailed description of FIG. 8). For example, the adaptive compressor power error can be the engine speed error at 505 divided by the correction gain at 520 or 525, and then the result being multiplied by an ETV scale. The adaptive compressor power error can indicate whether there is an elevated engine speed (for example, when the determined engine speed is greater than the nominal engine speed) or drooping (for example, when the determined engine speed is less than the nominal engine speed). The ETV scale can be, for example, the current ETV position at 530 divided by a predetermined full scale of ETV position. The ETV scale can be used to make up for nonlinearity in the mass flow through the ETV and the nonlinearity in the compressor curve map. The cause of the nonlinearities can be, for example, that in an 800-step ETV, at step 200, opening ETV one step would cause a much different power change compared to opening ETV one step at step 700. Handling nonlinearity in compressor curve map and in ETV response can make the TRU more energy efficient (e.g., faster reaction to drooping and elevated engine speed) because of less unnecessary throttling. It would be appreciated that the ETV scale can be a different ETV adjustment. For example, instead of using current ETV position over a full scale of ETV position, the ETV scale can be determined via an ETV curve map. The ETV curve map can be determined based on testing or simulation data of a similar TRU and can be stored in the controller.

FIG. 6 illustrates a flow diagram of a method 600 for setting a target compressor power, according to some embodiments. The method 600 can be used in conjunction with the methods 200, 300 discussed above and shown in FIGS. 2 and 3. At 605, similar to 215 in FIG. 2 or 315 in FIG. 3, a target or desired compressor power of the compressor can be determined, for example, by the controller (e.g., the TRS controller 135) based on a current compressor power and an adaptive compressor power error. The method 600 then proceeds to 610.

At 610, the target compressor power can be compared with a predetermined value (e.g. a constant MAX) by the controller. The predetermined value can be a maximum power the compressor can draw for a given condition. For example, when the engine power is limited to a 25 horsepower or 19 kilowatts, the predetermined value can be set to a maximum power draw allowed for the compressor, a maximum power available to the compressor, or a maximum power the compressor can handle. For example, in one operating mode (such as a heat mode variable horsepower control mode), the controller may set the predetermined value to limit the power that the compressor can draw to a level lower than the level of power that can be supplied by the engine.

If the determined target compressor power at 605 exceeds the predetermined value, the method 600 then proceeds to 615. At 615, the target compressor power is set to the predetermined value by the controller.

FIG. 7 illustrates a flow diagram of a method 700 for controlling an ETV based on a compressor suction pressure control point, according to some embodiments. The method 700 can be used in conjunction with the methods 200, 300 discussed above and shown in FIGS. 2 and 3. A controller (e.g., the TRS controller 135) can operate a compressor (e.g., the compressor 110 shown in FIG. 1) by adjusting an opening level of an ETV (e.g., the ETV 115 shown in FIG. 1) to achieve the suction pressure control point. The ETV can control a suction pressure of the compressor by controlling an amount of refrigerant flowing into the compressor. The controller can adjust the ETV by decreasing or increasing an opening level of the ETV to control the amount of refrigerant flowing into the compressor, and thus determine the target or desired suction pressure (suction pressure control point). The difference between a monitored suction pressure and the suction pressure control point can be used by the controller to adjust the ETV.

At 710, a target ETV position can be determined by the controller based on a current ETV position and the difference between the suction pressure control point and the monitored suction pressure. The current ETV position can be determined by, for example, counting from an ETV index range established at startup by exercising and overdriving a full voltage/drive range of the ETV. The method 700 then proceeds to 715.

At 715, when the target ETV position exceeds the current ETV position (e.g. in an 800-step ETV), which indicates that the suction pressure control point is greater than the monitored suction pressure, the method 700 then proceeds to 725. At 725, the opening level of the ETV is increased to achieve the target ETV position (i.e. to add an amount of refrigerant flowing into the compressor). The adjustment of the ETV can result in an engine load change. A load is added to an engine (e.g., the engine 140 shown in FIG. 1) (i.e. the compressor takes more power from the engine) when the opening level of the ETV is increased, and the engine speed may be reduced as a result.

When the target E IV position is less than the current ETV position (e.g. in an 800-step ETV), which indicates that the suction pressure control point is less than the monitored suction pressure, the method 700 then proceeds to 720. At 720, the opening level of the ETV is decreased to achieve the target ETV position (i.e. to reduce an amount of refrigerant flowing into the compressor). The adjustment of the ETV can result in an engine load change. A load is reduced from the engine (i.e. the compressor takes less power from the engine) when the opening level of the ETV is decreased, and the engine speed may be increased as a result.

Figure 8:
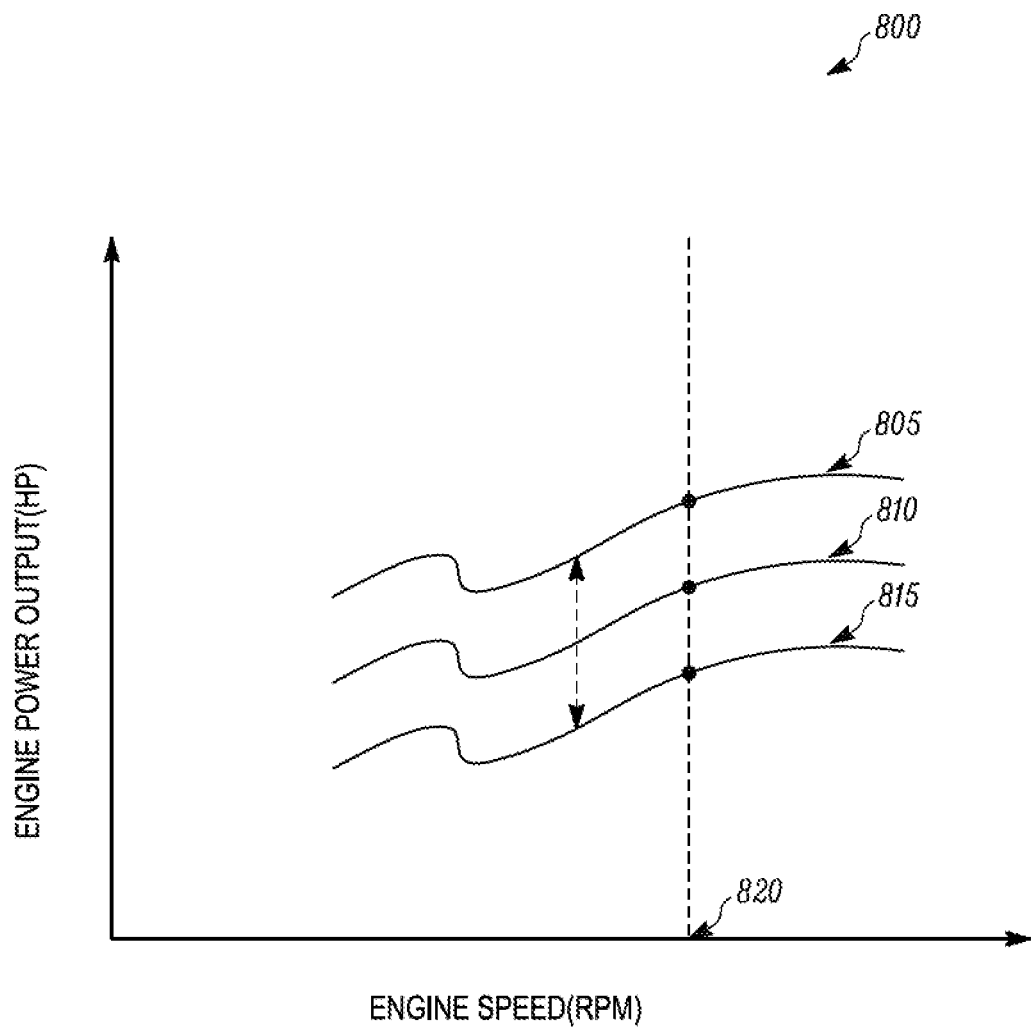
FIG. 8 illustrates an engine power curve map, according to some embodiments.

FIG. 8 illustrates an engine power curve map for an engine (e.g., the engine 140 shown in FIG. 1) with various engine power curves 805, 810, 815, according to some embodiments. An engine power curve map is a set of correlations between the engine speed and the engine power output. The engine power curves 805, 810, 815 can be determined based on testing or simulation data of a similar TRU. As the TRU is operating, the engine can move up (e.g., the engine curve 805) and/or down (e.g., the engine curve 815) based on environmental/external factors such as ambient temperature, elevation/altitude of the engine, engine performance degradation over life of the engine, fuel temperature, wear and/or possible malfunctions of engine components, and/or incorrect engine nominal/target speed.

The nominal engine speed 820 is where a mechanical setting of an engine speed stop is at. For example, for a greater-than 25 horsepower (or greater-than 19 kilowatts) engine, a mechanical stop on the engine speed throttle can be set so that the maximum engine output is 25 horsepower (or 19 kilowatts). The engine speed at the mechanical stop set point is the nominal engine speed (sometimes called target engine speed, or target nominal engine speed). The mechanical engine stop determines where the engine power curve lies. Incorrect setting of mechanical stop could further limit engine power output at the target nominal speed. The embodiments disclosed herein can monitor the real time engine speed (e.g. RPM) and drive the engine towards a specified set point corresponding to the mechanical stops on the engine speed throttle.

The embodiments disclosed herein can determine the appropriate engine power curve, and operate the compressor so that the system stays at the intersection of the engine power output and the target nominal engine speed. The embodiments disclosed herein can calculate the total amount of power that can be added to the compressor in order to bring engine speed back to the target nominal speed. The embodiments disclosed herein can load the engine up to its maximum power capability in a short period of time and prevent overload situations from operating conditions or mode changes. While the engine is drooping, embodiments disclosed herein can calculate the total amount of power that can be taken away from the compressor to bring engine speed back to the target nominal speed. Bringing engine speed back to the target nominal speed (where a mechanical stop is) can help utilize the maximum engine power output available to the system. Generally, the target nominal speed can be where the mechanical stop is when the engine is at a maximum available power for the target nominal speed.

Aspects

It is to be appreciated that any of aspects 1-10 can be combined with any of aspects 11-19.

Aspect 1. A method for adaptive power engine control of a transport refrigeration unit (TRU), comprising:

determining a current compressor power of a compressor of the TRU;

determining an adaptive compressor power error of the compressor;

calculating and setting a target compressor power of the compressor based on the current compressor power and the adaptive compressor power error;

determining a suction pressure control point of the compressor based on the target compressor power and a compressor curve map; and operating the compressor with the suction pressure control point of the compressor.

Aspect 2. The method according to aspect 1, wherein determining the current compressor power includes:

determining a compressor suction pressure and a compressor discharge pressure;

determining an engine speed of an engine powering the TRU; and determining a compressor power based on a compressor curve map, the engine speed, the compressor suction pressure, and the compressor discharge pressure.

Aspect 3. The method according to either one of aspects 1 or 2, wherein determining the adaptive compressor power error of the compressor includes:

determining an engine speed of an engine powering the TRU;

calculating an engine speed error based on the engine speed and a predetermined nominal engine speed;

determining an adjustment hand based on the engine speed error;

determining a current electronic throttling valve (ETV) position; and calculating a compressor power error based on the engine speed error, the adjustment band, and the current ETV position.

Aspect 4. The method according to aspect 3, wherein determining the adjustment band based on the engine speed error includes:

when the engine speed error is within a predetermined range, setting the adjustment band to a fine band; and when the engine speed error exceeds the predetermined range, setting the adjustment band to a coarse band.

Aspect 5. The method according to any one of aspects 1-4, wherein calculating and setting the target compressor power of the compressor includes:

calculating the target compressor power based on the current compressor power and the adaptive compressor power error; and when the target compressor power exceeds a predetermined maximum allowable compressor power, setting the target compressor power to the predetermined maximum allowable compressor power.

Aspect 6. The method according to any one of aspects 1-5, wherein operating the compressor with the suction pressure control point of the compressor includes:

adjusting an opening level of an electronic throttling valve (ETV) of the TRU, based on the compressor suction pressure control point, to adjust the suction pressure of the compressor.

Aspect 7. The method according to aspect 6, wherein adjusting the opening level of the ETV of the TRU includes:

when the adaptive compressor power error of the compressor determines an elevated engine speed, increasing an opening level of the ETV to increase an amount of refrigerant flowing into a suction port of the compressor; and when the adaptive compressor power error of the compressor determines a drooping of the engine, decreasing the opening level of the ETV to decrease the amount of refrigerant flowing into a suction port of the compressor.

Aspect 8. The method according to any one of aspects 1-7, further comprising:

determining a band adjustment of the compressor based on the operation of the compressor by:

determining an engine speed of an engine powering the TRU;

calculating an engine speed error based on the engine speed and a predetermined nominal engine speed; and determining a second current compressor power of the compressor based on the engine speed error.

Aspect 9. The method according to aspect 8, wherein determining the second current compressor power of the compressor includes:

when the engine speed error is within a predetermined range, setting the second current compressor power of the compressor to the target compressor power of the compressor; and when the engine speed error exceeds the predetermined range, determining the second current compressor power of the compressor.

Aspect 10. The method according to aspect 9, wherein determining the second current compressor power of a compressor includes:

determining a compressor suction pressure and a compressor discharge pressure;

determining an engine speed of an engine powering the TRU; and determining the second current compressor power based on a compressor curve map, the determined engine speed, the determined compressor suction pressure, and the determined compressor discharge pressure.

Aspect 11. A transport refrigeration unit (TRU) with adaptive power engine control comprising:

a refrigeration circuit including a compressor, a condenser, an expansion device, an evaporator, and an electronic throttling valve (ETV); and a controller configured to control operation of the refrigeration circuit, wherein the ETV is configured to control a volume of refrigerant flowing into a suction port of the compressor of the TRU, wherein the controller is configured to:

determine a suction pressure and a discharge pressure of the compressor, an engine speed of an engine powering the TRU, and an ETV position of the ETV, determine a current compressor power of the compressor based on the suction pressure, the discharge pressure, the engine speed, and a compressor curve map, determine an adaptive compressor power error of the compressor based on the engine speed and the ETV position, calculate a target compressor power of the compressor based on the current compressor power and the adaptive compressor power error, control a suction pressure of the compressor based on the target compressor power, and operate the compressor with the controlled suction pressure.

Aspect 12. The TRU according to aspect 11, wherein the controller is configured to:
calculate an engine speed error based on the engine speed and a predetermined nominal engine speed,
determine an adjustment band based on the engine speed error, and
determine the adaptive compressor power error of the compressor based on the engine speed error, the adjustment band, and the ETV position.

Aspect 13. The TRU according to aspect 12, wherein when the engine speed error is within a predetermined range, the controller is configured to set the adjustment band to a fine band; and
when the engine speed error exceeds the predetermined range, the controller is configured to set the adjustment band to a coarse band.

Aspect 14. The TRU according to any one of aspects 11-13, wherein when the target compressor power exceeds a predetermined maximum allowable compressor power, the controller is configured to set the target compressor power to the predetermined maximum allowable compressor power.

Aspect 15. The TRU according to any one of aspects 11-14, wherein the controller is configured to:
determine a compressor suction pressure control point based on the target compressor power, the engine speed, and the compressor curve map, and
adjust the ETV of the TRU, based on the compressor suction pressure control point, to adjust the suction pressure of the compressor.

Aspect 16. The TRU according to aspect 15, wherein when the adaptive compressor power error of the compressor determines an elevated engine speed, the controller is configured to increase an opening level of the ETV to control an amount of refrigerant flowing into the compressor; and
wherein when the adaptive compressor power error of the compressor determines a drooping of the engine, the controller is configured to decrease the opening level of the ETV to control the amount of refrigerant flowing into the compressor.

Aspect 17. The TRU according to any one of aspects 11-16, wherein the controller is configured to:
determine a band adjustment of the compressor based on operation of the compressor,
determine a second engine speed of the engine powering the TRU,
calculate an engine speed error based on the second engine speed and a predetermined nominal engine speed, and
determine a second current compressor power of the compressor based on the engine speed error.

Aspect 18. The TRU according to aspect 17, wherein when the engine speed error is within a predetermined range, the controller is configured to set the second current compressor power of the compressor to the target compressor power of the compressor; and
wherein when the engine speed error exceeds the predetermined range, the controller is configured to determine the second current compressor power of the compressor.

Aspect 19. The TRU according to aspect 18, wherein the controller is configured to determine a compressor suction pressure and a compressor discharge pressure; and
wherein the controller is configured to determine the second current compressor power based on the compressor curve map, the determined engine speed, the determined compressor suction pressure, and the determined compressor discharge pressure.

Aspect 20. The TRU according to any one of aspects 11-19, further comprising the engine powering the TRU.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to he understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic, scope thereof, with the true scope and spirit of the disclosure being indicated by the claims that follow.

What is claimed is:

1. A method for adaptive power engine control of a transport refrigeration unit (TRU), comprising:
   determining a current compressor power of a compressor of the TRU, the current compressor power is a power the compressor currently takes from an engine powering the TRU;
   determining an adaptive compressor power error of the compressor, the adaptive compressor power error is an amount of power to be allocated to the compressor when a speed of the engine powering the TRU is elevated in order to maximize a use of available power from the engine, or an amount of power to be taken away from the compressor when the engine is drooping in order to recover the engine from drooping;
   calculating and setting a target compressor power of the compressor based on the current compressor power and the adaptive compressor power error;
   determining a suction pressure control point of the compressor based on the target compressor power, a compressor discharge pressure, and an engine speed of the engine powering the TRU; and
   operating the compressor with the suction pressure control point of the compressor, wherein the suction pressure control point is a target suction pressure.

2. The method according to claim 1, wherein determining the current compressor power includes:
   determining a compressor suction pressure and a compressor discharge pressure;
   determining the engine speed of the engine powering the TRU; and
   determining a compressor power based on the engine speed, the compressor suction pressure, and the compressor discharge pressure.

3. The method according to claim 1, wherein determining the adaptive compressor power error of the compressor includes:
   determining the engine speed of the engine powering the TRU;
   calculating an engine speed error based on the engine speed and a predetermined nominal engine speed;
   determining an adjustment band based on the engine speed error;

determining a current electronic throttling valve (ETV) position; and calculating a compressor power error based on the engine speed error, the adjustment band, and the current ETV position.

4. The method according to claim 3, wherein determining the adjustment band based on the engine speed error includes:

when the engine speed error is within a predetermined range, setting the adjustment band to a fine band; and when the engine speed error exceeds the predetermined range, setting the adjustment band to a coarse band.

5. The method according to claim 1, wherein calculating and setting the target compressor power of the compressor includes:

calculating the target compressor power based on the current compressor power and the adaptive compressor power error; and when the target compressor power exceeds a predetermined maximum allowable compressor power, setting the target compressor power to the predetermined maximum allowable compressor power.

6. The method according to claim 1, wherein operating the compressor with the suction pressure control point of the compressor includes:

adjusting an opening level of an electronic throttling valve (ETV) of the TRU, based on the compressor suction pressure control point, to adjust the suction pressure of the compressor.

7. The method according to claim 6, wherein adjusting the opening level of the ETV of the TRU includes:

when the adaptive compressor power error of the compressor determines an elevated engine speed, increasing an opening level of the ETV to increase an amount of refrigerant flowing into a suction port of the compressor; and when the adaptive compressor power error of the compressor determines a drooping of the engine, decreasing the opening level of the ETV to decrease the amount of refrigerant flowing into a suction port of the compressor.

8. The method according to claim 1, further comprising:

determining a band adjustment of the compressor based on the operation of the compressor by:

determining the engine speed of the engine powering the TRU;

calculating an engine speed error based on the engine speed and a predetermined nominal engine speed; and determining a second current compressor power of the compressor based on the engine speed error.

9. The method according to claim 8, wherein determining the second current compressor power of the compressor includes:

when the engine speed error is within a predetermined range, setting the second current compressor power of the compressor to the target compressor power of the compressor; and when the engine speed error exceeds the predetermined range, determining the second current compressor power of the compressor.

10. The method according to claim 9, wherein determining the second current compressor power of a compressor includes:

determining a compressor suction pressure and a compressor discharge pressure;

determining the engine speed of the engine powering the TRU; and determining the second current compressor power based on the determined engine speed, the determined compressor suction pressure, and the determined compressor discharge pressure.

11. A transport refrigeration unit (TRU) with adaptive power engine control comprising:

a refrigeration circuit including a compressor, a condenser, an expansion device, an evaporator, and an electronic throttling valve (ETV); and a controller configured to control operation of the refrigeration circuit, wherein the ETV is configured to control a volume of refrigerant flowing into a suction port of the compressor of the TRU, wherein the controller is configured to:

determine a suction pressure and a discharge pressure of the compressor, an engine speed of an engine powering the TRU, and an ETV position of the ETV, determine a current compressor power of the compressor based on the suction pressure, the discharge pressure, and the engine speed; the current compressor power being a power the compressor currently takes from the engine powering the TRU, determine an adaptive compressor power error of the compressor based on the engine speed and the ETV position, the adaptive compressor power error is an amount of power to be allocated to the compressor when the engine speed of the engine powering the TRU is elevated in order to maximize a use of available power from the engine, or an amount of power to be taken away from the compressor when the engine is drooping in order to recover the engine from drooping, calculate a target compressor power of the compressor based on the current compressor power and the adaptive compressor power error, control a suction pressure of the compressor based on the target compressor power to achieve the target compressor power, and operate the compressor with the controlled suction pressure.

12. The TRU according to claim 11, wherein the controller is configured to:

calculate an engine speed error based on the engine speed and a predetermined nominal engine speed, determine an adjustment band based on the engine speed error, and determine the adaptive compressor power error of the compressor based on the engine speed error, the adjustment band, and the ETV position.

13. The TRU according to claim 12, wherein when the engine speed error is within a predetermined range, the controller is configured to set the adjustment band to a fine band; and when the engine speed error exceeds the predetermined range, the controller is configured to set the adjustment band to a coarse band.

14. The TRU according to claim 11, wherein when the target compressor power exceeds a predetermined maximum allowable compressor power, the controller is configured to set the target compressor power to the predetermined maximum allowable compressor power.

15. The TRU according to claim 11, wherein the controller is configured to:

determine a compressor suction pressure control point based on the target compressor power, the engine speed, and the discharge pressure, and adjust the ETV of the TRU, based on the compressor suction pressure control point, to adjust the suction pressure of the compressor.

16. The TRU according to claim 15, wherein when the adaptive compressor power error of the compressor determines an elevated engine speed, the controller is configured to increase an opening level of the ETV to control an amount of refrigerant flowing into the compressor; and wherein when the adaptive compressor power error of the compressor determines a drooping of the engine, the controller is configured to decrease the opening level of the ETV to control the amount of refrigerant flowing into the compressor.

17. The TRU according to claim 11, wherein the controller is configured to:

determine a band adjustment of the compressor based on operation of the compressor, determine a second engine speed of the engine powering the TRU, calculate an engine speed error based on the second engine speed and a predetermined nominal engine speed, and determine a second current compressor power of the compressor based on the engine speed error.

18. The TRU according to claim 17, wherein when the engine speed error is within a predetermined range, the controller is configured to set the second current compressor power of the compressor to the target compressor power of the compressor; and wherein when the engine speed error exceeds the predetermined range, the controller is configured to determine the second current compressor power of the compressor.

19. The TRU according to claim 18, wherein the controller is configured to determine a compressor suction pressure and a compressor discharge pressure; and wherein the controller is configured to determine the second current compressor power based on the determined engine speed, the determined compressor suction pressure, and the determined compressor discharge pressure.

20. The TRU according to claim 11, further comprising the engine powering the TRU.

21. A method for adaptive power engine control of a transport refrigeration unit (TRU), comprising:

determining a current compressor power of a compressor of the TRU, the current compressor power is a power the compressor currently takes from an engine powering the TRU;

determining an adaptive compressor power error of the compressor, the adaptive compressor power error is an amount of power to be allocated to the compressor when a speed of the engine powering the TRU is elevated in order to maximize a use of available power from the engine, or an amount of power to be taken away from the compressor when the engine is drooping in order to recover the engine from drooping;

calculating and setting a target compressor power of the compressor based on the current compressor power and the adaptive compressor power error;

determining a suction pressure control point of the compressor based on the target compressor power, a compressor discharge pressure, and an engine speed of the engine powering the TRU; and operating the compressor with the suction pressure control point of the compressor, wherein the suction pressure control point is a target suction pressure, wherein determining the adaptive compressor power error of the compressor includes:

determining the engine speed of the engine powering the TRU;

calculating an engine speed error based on the engine speed and a predetermined nominal engine speed;

determining an adjustment band based on the engine speed error;

determining a current electronic throttling valve (ETV) position; and calculating a compressor power error based on the engine speed error, the adjustment band, and the current ETV position.

* * * * *